United States Patent
Lee

(10) Patent No.: US 6,354,932 B1
(45) Date of Patent: Mar. 12, 2002

(54) PROCESSING SYSTEM FOR BONING AND SKINNING POULTRY

(76) Inventor: Han Moo Lee, 3961 Via Marisol, Apt. 114, Los Angeles, CA (US) 90042

(*) Notice: Subject to any disclaimer, the term of this patent is extended or adjusted under 35 U.S.C. 154(b) by 0 days.

(21) Appl. No.: 09/589,916

(22) Filed: Jun. 7, 2000

(51) Int. Cl.$^7$ .............................. A22C 21/06; A22B 5/16
(52) U.S. Cl. ..................... 452/122; 452/138; 452/127
(58) Field of Search ............................ 452/135, 125, 452/127, 129, 136, 138, 116, 122

(56) References Cited

U.S. PATENT DOCUMENTS

| | | | | |
|---|---|---|---|---|
| 2,785,434 A | * | 3/1957 | Terranova | 452/136 |
| 3,210,801 A | * | 10/1965 | Terranova | 452/136 |
| 3,456,284 A | * | 7/1969 | Werner et al. | 452/136 |
| 3,472,300 A | * | 10/1969 | Conrad | 452/135 |
| 5,167,568 A | * | 12/1992 | Esbroeck et al. | 452/116 |
| 5,181,878 A | * | 1/1993 | Bekkers | 452/122 |
| 5,197,917 A | * | 3/1993 | Verbakel et al. | 452/127 |
| 5,199,922 A | * | 4/1993 | Korenberg et al. | 452/122 |
| 5,267,891 A | * | 12/1993 | Cresson et al. | 452/135 |
| 5,297,984 A | * | 3/1994 | Gagliardi, Jr. | 452/136 |

\* cited by examiner

*Primary Examiner*—Peter M. Poon
*Assistant Examiner*—Son T. Nguyen
(74) *Attorney, Agent, or Firm*—Lyon & Lyon LLP

(57) ABSTRACT

A poultry processing machine including a distribution housing, a rotating dome and a truncated conical surface outwardly of the dome for the distribution of quarter legs to several processing units. Gates control the admission of the pieces to the processing units. The processing unit includes a converging inlet within which horizontal extending bars are positioned to allow the smaller end of the piece to drop downwardly into the unit. A rotatable circular blade and traction wheels draw the piece downwardly along with the operation of vacuum from a rotatable cutter. A passageway concentrically arranged within the cutter receives the bone of the quarter leg and vacuum drawn through the rotatable cutter draws the piece downwardly. A spreading surface lays the now deboned and longitudinally sliced piece into a flat slab. A skinning device having vacuum associated with a porous wheel pulls the skin away from the flesh. A skinning knife assists in this process. The skin is then discharged from the surface of the wheel by a compressed air section while the flesh progresses outwardly to trigger an outlet sensor which initiates the process again through the opening of the corresponding gate above the truncated conical surface.

12 Claims, 10 Drawing Sheets

PROCESSING SYSTEM FOR BONING AND SKINNING POULTRY

BACKGROUND OF THE INVENTION

The field of the present invention relates to the process of processing poultry meat.

The processing of poultry, where the bones and the skin are removed, has been in demand as interest in healthy and dietetic consumption continually increases. The manner in which the process is conducted has commanded particular attention. In addition to the increasing government standards of safety, market pressure has increased the need for an automated processing system.

One problem that the automated boning and skinning of poultry may encounter is concerned with the quarter legs, specifically the differences in the shape of the raw meat separated from the thighbone and the tibia bone. Thusly, the continued expansion of the boning and skinning industry may be facilitated by an improved, efficient, and cost-effective automated process.

SUMMARY OF THE INVENTION

The present invention is directed to an apparatus for processing poultry. The apparatus includes a rotatable cutter with a passageway that results in the separation of the poultry meat from the bones.

In a first separate aspect of the present invention, the apparatus includes the rotatable cutter with the passageway being in communication with a source of vacuum. The passageway is within knife elements of the cutter that are arranged in a circle concentrically about the axis of rotation of the cutter to draw legs into the rotating cutter. The knife elements may be flexibly supported to follow the contour of the bone and accommodate variation in part size.

In a second separate aspect of the present invention, the apparatus includes the rotatable cutter, the passageway and a blade positioned before the cutting edges of the knife elements. The plane of this blade is substantially aligned with the axis of rotation of the rotatable cutter to slice the meat longitudinally along the bones. This blade may be circular, rotatable and spring biased toward the axis of the rotatable cutter. Further, this blade when rotatable may include traction wheels rotatably mounted with and to either side of the rotatable circular blade such that the circular blade extends radially from between the traction wheels.

In a third separate aspect of the present invention, the apparatus includes the rotatable cutter about the passageway and a spreading surface that includes a wall extending to a point before the cutting edges of the knife elements to one side of the rotatable cutter. In addition, a ridge extends from the wall to the rotatable cutter and a discharge surface extends from the rotatable cutter to lay the meat down flat.

In a fourth separate aspect of the present invention, the apparatus includes the rotatable cutter, the passageway therethrough and a skinning device behind the cutting edges of the knife elements. The skinning device includes a hollow wheel with a porous cylindrical surface. Within the hollow wheel, there is a vacuum manifold and a compressed air manifold. A skinning knife is adjacent and spaced from the cylindrical surface of the hollow wheel and the vacuum manifold.

In a fifth separate aspect of the present invention, the apparatus includes the rotatable cutter, the passageway and a converging inlet above the rotatable cutter. Horizontally extending bars are pivotally mounted in the inlet about vertical axes to guide the poultry to the cutter.

In a sixth separate aspect of the present invention, the apparatus includes a dome rotatable about a vertical axis and a truncated conical surface extending outwardly from and concentric with the dome and leading to a plurality of the rotatable cutters. Gates extend about the truncated conical surface and are upwardly movable from a first position to a second displaced position above the truncated conical surface to control feed of the poultry parts to the cutters.

In a seventh separate aspect of the present invention, the apparatus includes a dome rotatable about a vertical axis and a truncated conical surface extending outwardly from and concentric with the dome and gate sensors adjacent to the truncated conical surface in order to detect the presence of poultry. The gate sensors are coupled with a controller, capable of extending gates upwardly movable from a first position to a second displaced position on above the truncated conical surface to the first position on the truncated conical surface when the poultry is detected to control the feed of the poultry pieces.

In an eighth separate aspect of the present invention, the apparatus includes the rotatable cutters with the passageways being in communication with a source of vacuum and actuation sensors in the converging inlets for detecting the presence of poultry. The actuation sensors are coupled with a controller, which energizes the source of vacuum when the poultry is sensed in the converging inlets to draw poultry pieces into the rotatable cutters.

In a ninth separate aspect of the present invention, the apparatus includes the rotatable cutters, the passageways therethrough, a skinning device behind the rotatable cutters and a truncated conical surface leading to a plurality of the rotatable cutters. Gates extend about the truncated conical surface and are upwardly movable from a first position to a second displaced position above the truncated conical surface to control feed of the poultry parts to the cutters. Outlet sensors positioned after the skinning device detect the presence of the poultry. Upon such detection, a controller coupled with the outlet sensors retracts the gates to the second position displaced upwardly from the truncated conical surface.

In a tenth separate aspect of the present invention, combinations of any of the foregoing separate aspects are also contemplated.

Accordingly, it is an object of the present invention to provide an automated processing system for processing poultry. Other and further objects and advantages will appear hereinafter.

DETAILED DESCRIPTION OF THE PREFERRED EMBODIMENT

Figure 1:
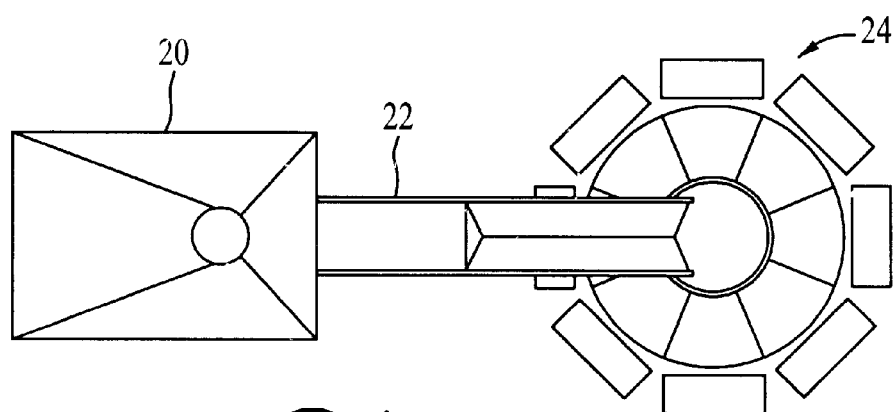
FIG. 1 is a top view of the poultry processing plant.
Figure 2:
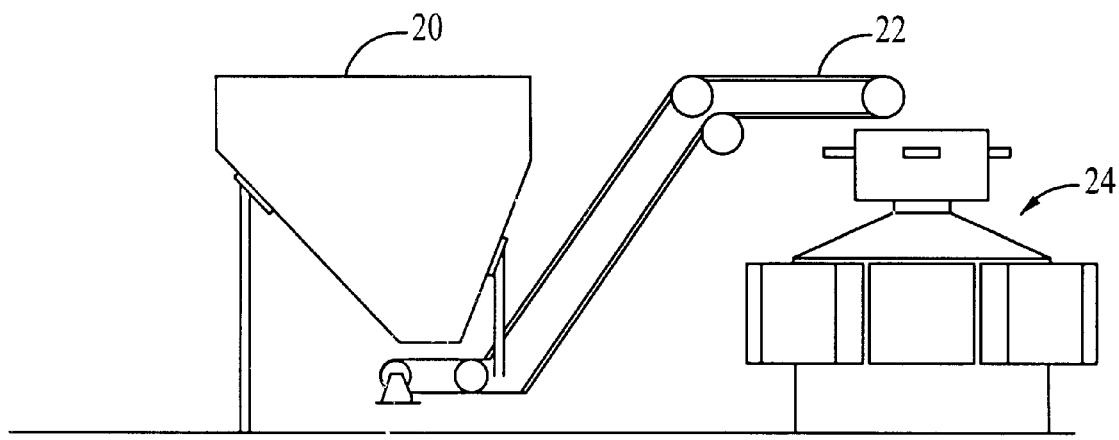
FIG. 2 is a side view of the poultry processing plant.

Turning in detail to the drawings, a poultry processing machine is disclosed which is illustrated in overview in FIGS. 1 and 2. A hopper 20 containing quarter legs of poultry such as chicken feeds via a belt 22 with conventional means for limiting the amount of parts fed to the belt at any one time. The belt 22 discharges quarter legs into the processing machine, generally designated 24.

Figure 3:
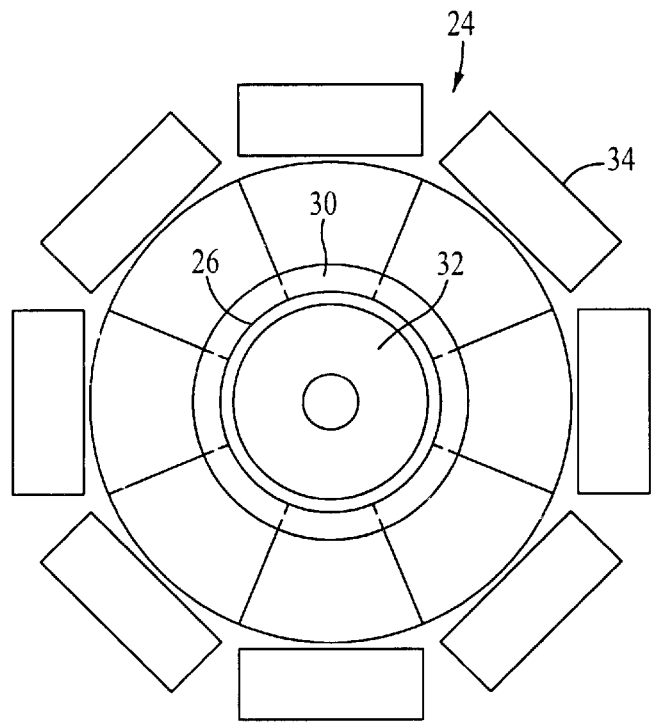
FIG. 3 is a top view of the processing machine with eight processing units.
Figure 4:
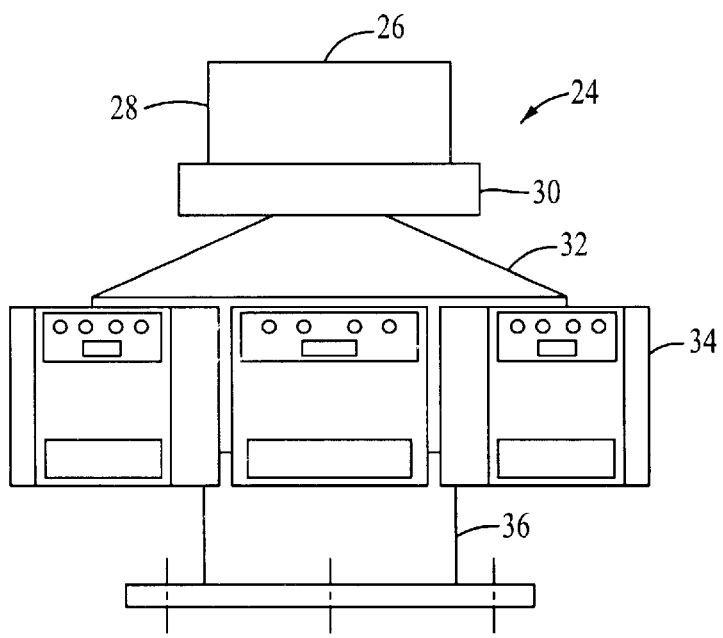
FIG. 4 is a side view of the processing machine with eight processing units.

An overview of the specific processor 24 is illustrated in FIGS. 3 and 4. A distribution housing 26 includes a cylindrical wall 28 open at the top and bottom. A lower, cylindrical cover 30 extends outwardly and downwardly from the cylindrical wall 28 to further cover lower portions of the processor. A substantially conical distribution surface 32 extends symmetrically below the distribution housing 26. Eight processing units 34 are schematically illustrated about the processor 24. The entire device is supported on a base 36.

Figure 5:
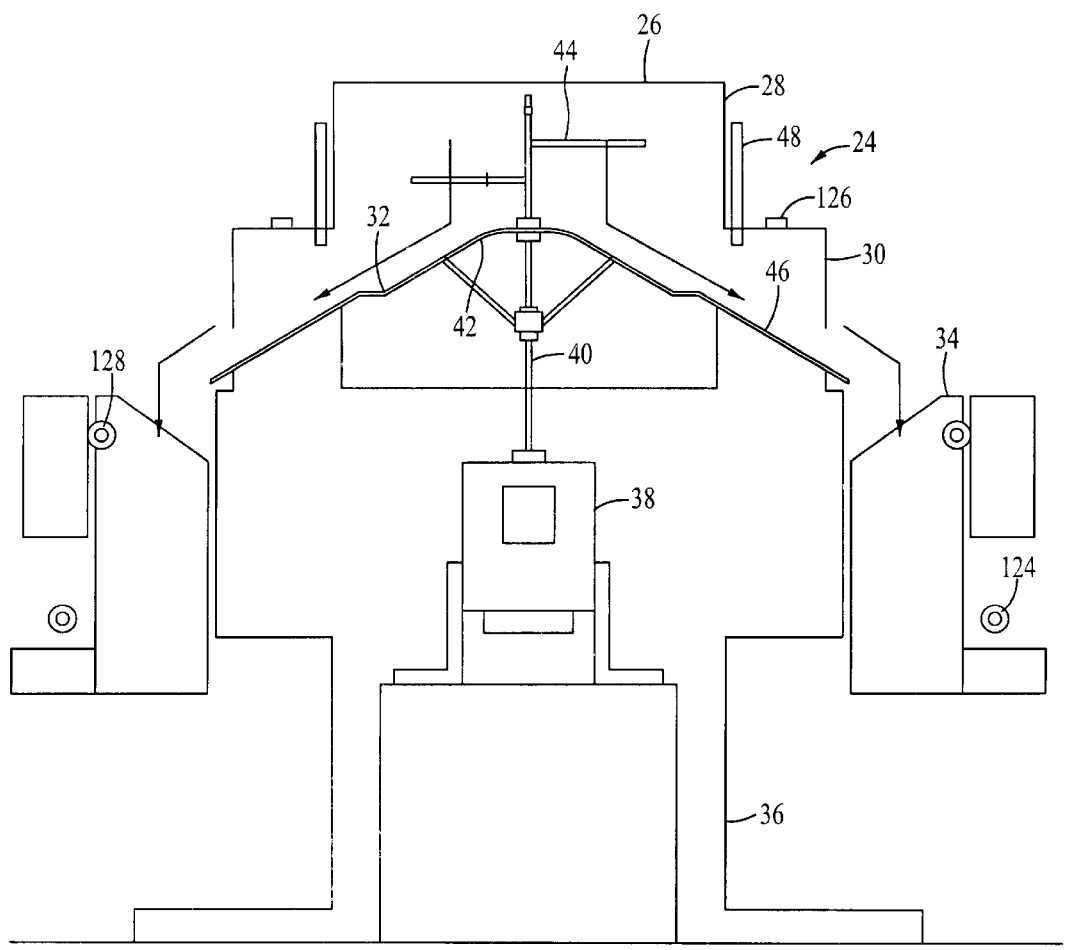
FIG. 5 is a schematic cross-sectioned side view of the processing machine.

Turning in greater detail to the overall processor as illustrated in FIG. 5, a motor 38 is centrally located below the distribution surface 32. The shaft of the motor is coupled with a supporting shaft 40 which extends upwardly. A dome 42 is rotatably mounted in the processor 24 on the supporting shaft 40. Above the dome 42, distribution arms 44 also rotate via the shaft 40. A truncated conical surface 46 extends outwardly and concentrically about the dome 42. The surface 46 slopes outwardly and downwardly from the dome 42 for distribution to the processing units 34.

Figure 6:
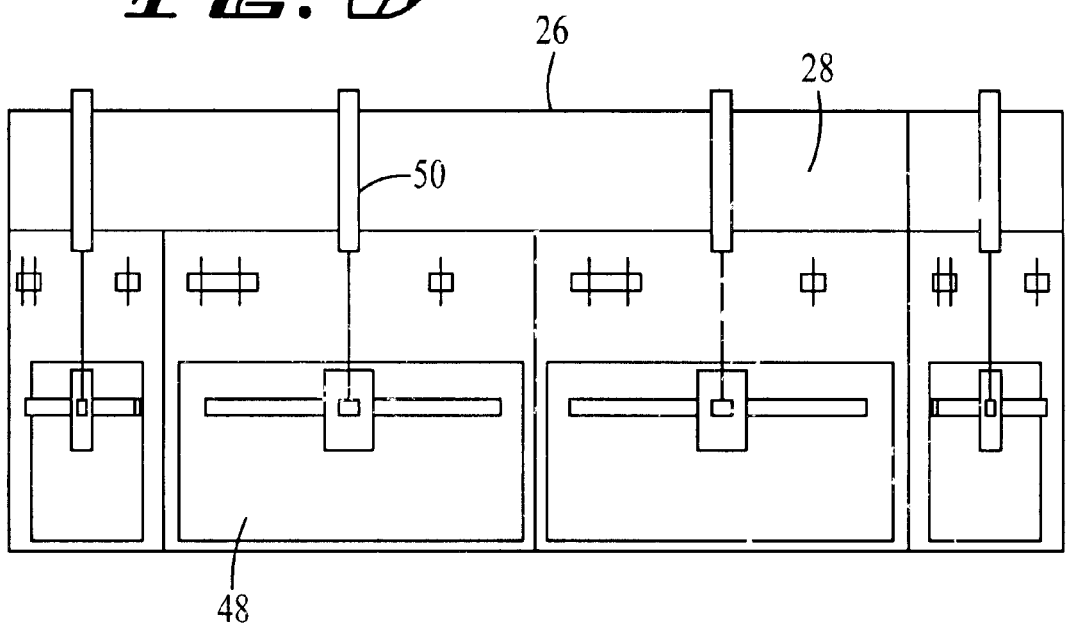
FIG. 6 is a side view of the processing machine illustrating gates with air cylinders.
Figure 7:
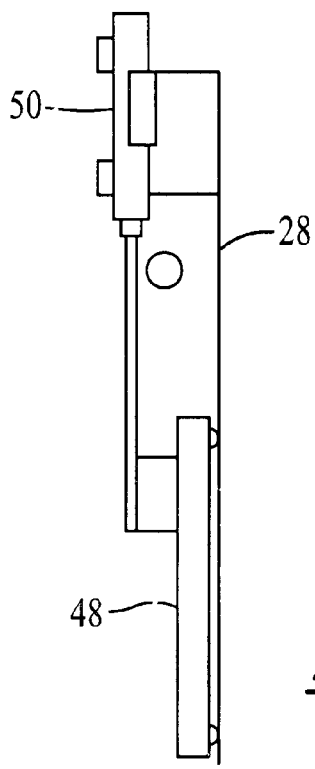
FIG. 7 is a side view of one air cylinder and gate.

As illustrated in FIGS. 6 and 7, the cylindrical wall 28 of the distribution housing 26 supports gates 48. The gates 48 move up and down on the outside of the cylindrical wall 28 as actuated by pneumatic cylinders, hydraulic cylinders or solenoids 50. The gates 48 each include a first position with the lower edge of the gate on the truncated conical surface 46. A second position for each of the gates is displaced upwardly from the truncated conical surface 46 to allow passage of quarter legs therethrough. The entire truncated conical surface 46 may be vibrated to enhance flow of parts through the gate area and into the processing units when a gate 48 is in the upwardly displaced position.

Figure 8:
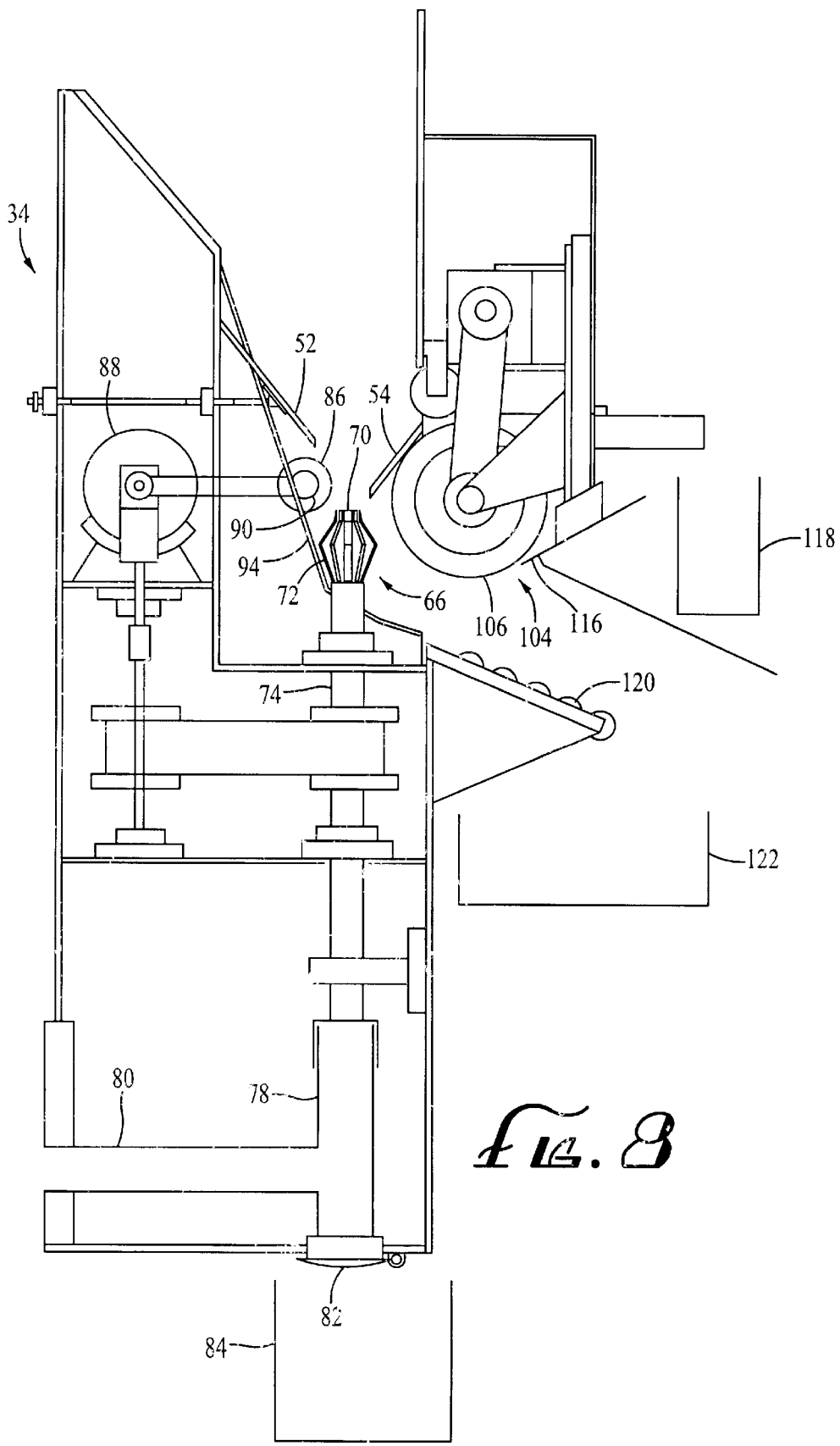
FIG. 8 is a schematic cross-sectional side view of one of the processing units.

Looking specifically at a processing unit 34, reference is made to FIGS. 8 through 16, with an overview provided by FIG. 8. The processing unit 34 includes a converging inlet defined by 52 and 54. Similar plates (not shown) may be provided to either end of plates 52 and 54 to define a convergence of the inlet.

Above the plates 52 and 54, a mechanism for properly orienting the quarter leg with the tibia oriented downwardly is employed. The device is illustrated in FIGS. 9 through 12. Converging plates 56 and 58 are arranged to either side of the inlet of the processing unit 34. Horizontally extending bars 60 and 62 are pivotally connected within the inlet about vertical axes. This mounting is effected by a loose fit within eye bolts 64 which are adjustably mounted to the side of the processing unit 34. The pivoted horizontally extending bars 60 and 62 accommodate the receipt of a quarter leg and are spaced such that the tibia end of the piece fits easily through the space between the bars. This promotes an orientation with the tibia extending downwardly into the converging inlet such that it may be drawn into subsequent processing.

Figure 8A:
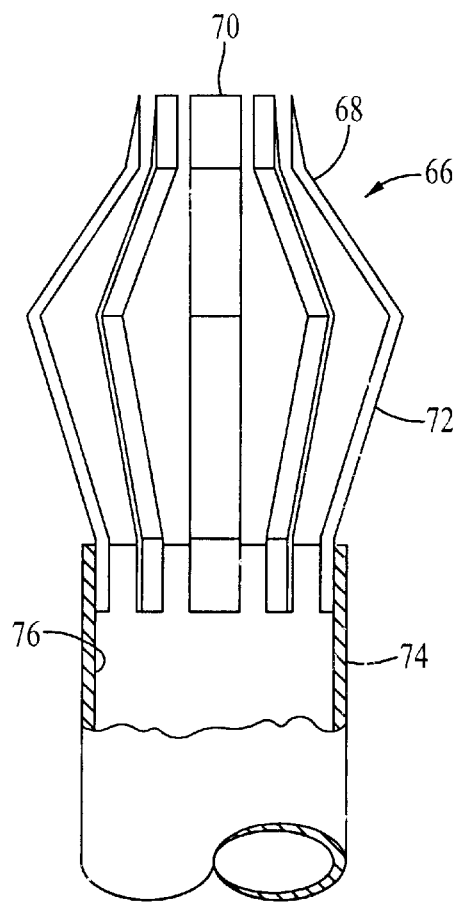
FIG. 8A is a cross-sectional side view of the rotatable cutter.

At the center of the processing unit 34 is a rotatable cutter, generally designated 66. The cutter 66 is illustrated in larger scale in FIG. 8A. The cutter includes knife elements 68 which extend upwardly to a circle concentrically arranged about the axis of rotation of the cutter. The knife elements 68 include cutting edges 70 which may be segments of a cylinder, sharpened with a leading edge diagonally arranged relative to the axis of rotation, serrated or the like. The elements 68 extend through resilient supports 72 to be flexible toward and away from the axis of rotation. A pipe 74 supports the rotatable cutter 66 and defines, along with the sum of the knife elements 68 a passageway 76. The pipe 74 is rotatably mounted within the processing unit 34 and extends downwardly to a manifold 78 from which there is a vacuum source 80 and a one-way door 82 into a container 84. The one-way door is closed by a spring bias and sealed upon application of vacuum through the vacuum source 80.

Figure 8B:
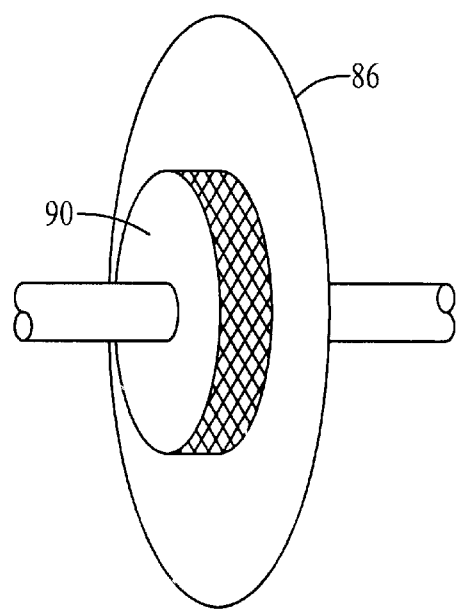
FIG. 8B is a perspective view of the rotatable-circular blade.
Figure 9:
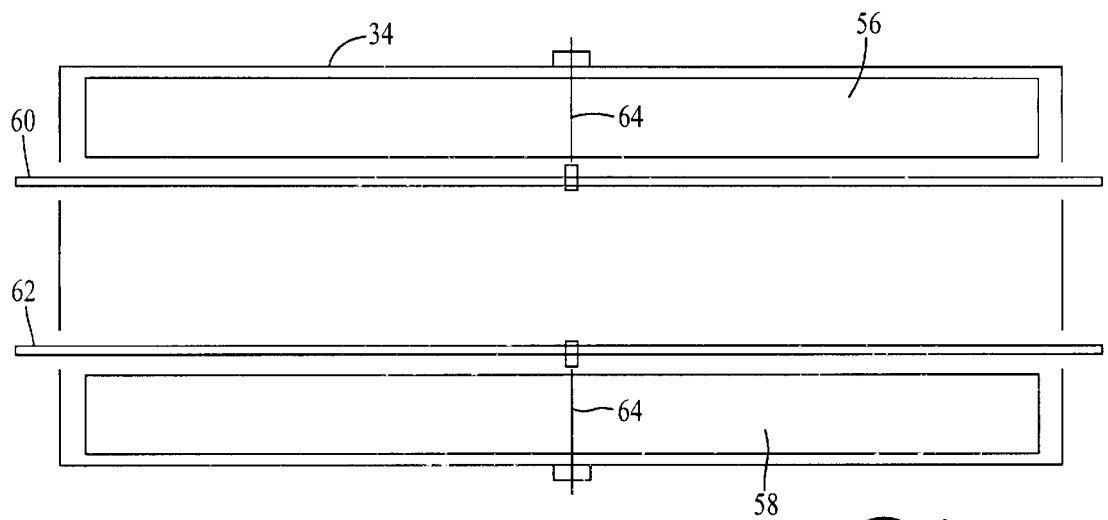
FIG. 9 is a plan view of the balancing and position bars within the inlet to one of the processing units.
Figure 10:
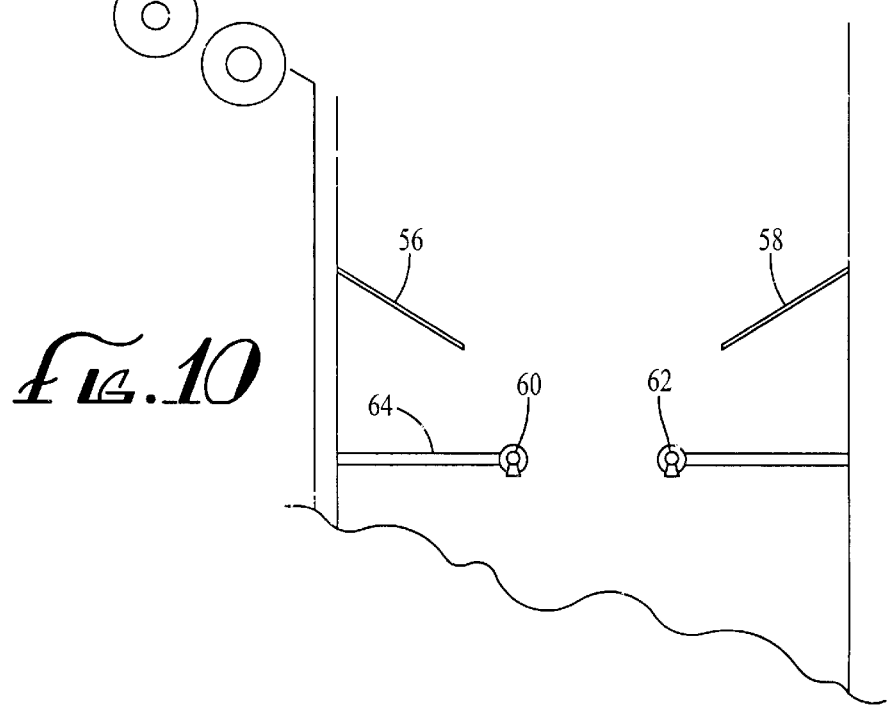
FIG. 10 is a schematic cross-sectional side view of the inlet to one of the processing units.
Figure 11:
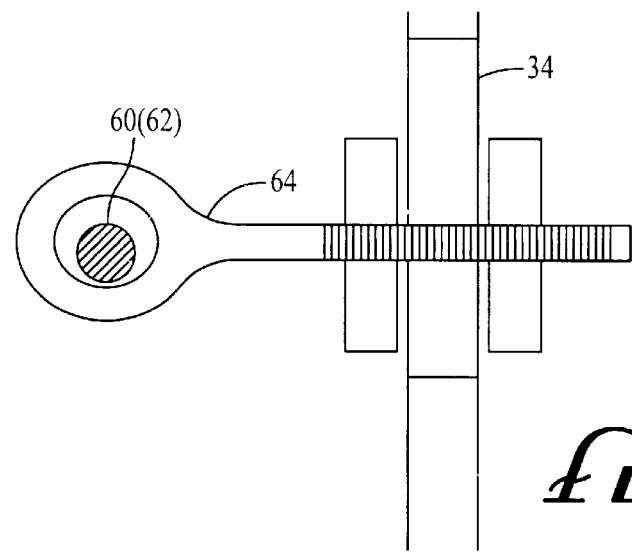
FIG. 11 is an side view of the balancing bar holder and adjustment mechanism.
Figure 12:
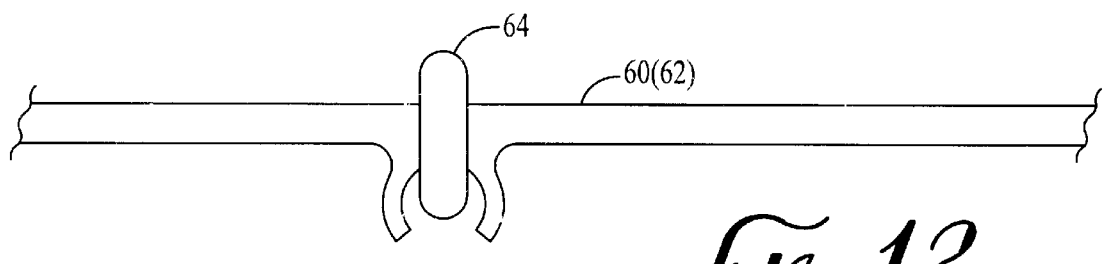
FIG. 12 is a side view of one of the balancing bars.

A rotatable circular blade 86 is located before the rotatable cutter in the processing unit 34. The rotatable circular blade 86 is best illustrated in FIG. 8B and in context in FIG. 8. The plane of this circular blade 86 is preferably aligned with the rotational axis of the rotatable cutter 66. The blade 86 may be spring biased toward that axis to insure cutting fully through the meat to and against the bone as a quarter leg passes through the processing unit and into the rotatable cutter 66. A motor 88 drives both the rotatable circular blade 86 and the rotatable cutter 66. The blade 86 may further include traction wheels 90 to either side of the blade 86. Therefore, the circular blade 86 extends radially from between to such traction wheels 90.

Figure 13:
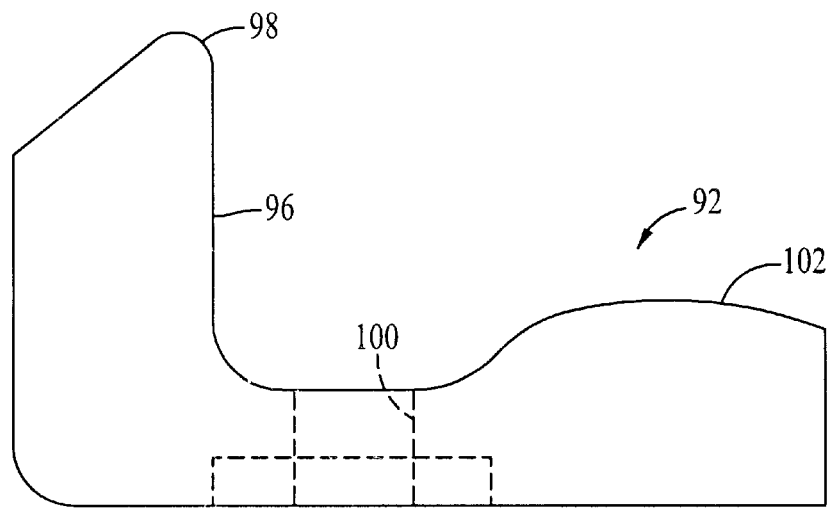
FIG. 13 is a side view of the spreading device.
Figure 14:
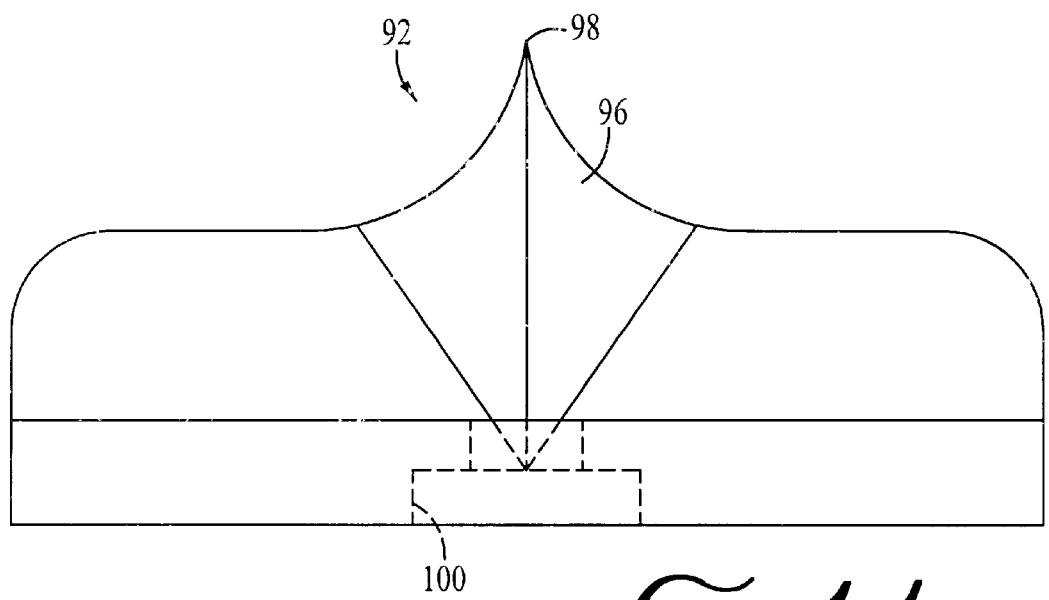
FIG. 14 is a front cross-sectional view taken along line 14—14 of FIG. 13.
Figure 15:
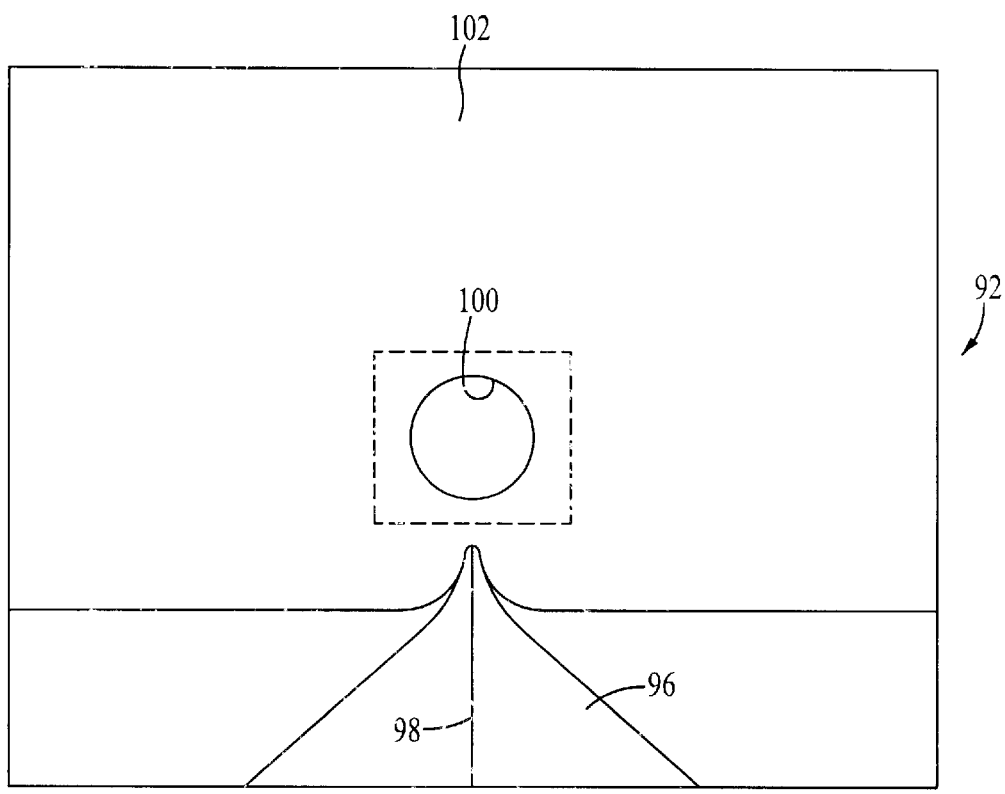
FIG. 15 is a top view of the spreading device.

A spreading surface, generally designated 92, is illustrated in FIGS. 13, 14 and 15. The spreading surface 92 would be positioned over or replace the angled plate 94 illustrated in FIG. 8. The spreading surface includes a wall 96 which extends to before the rotatable cutter 66. The wall 96 forms a ridge 98 which is substantially aligned with the circular blade 86. A hole 100 receives the pipe 74 supporting the rotatable cutter 66. A discharge surface 102 leads away from the wall 96 to the other side of the rotatable cutter 66.

Figure 16:
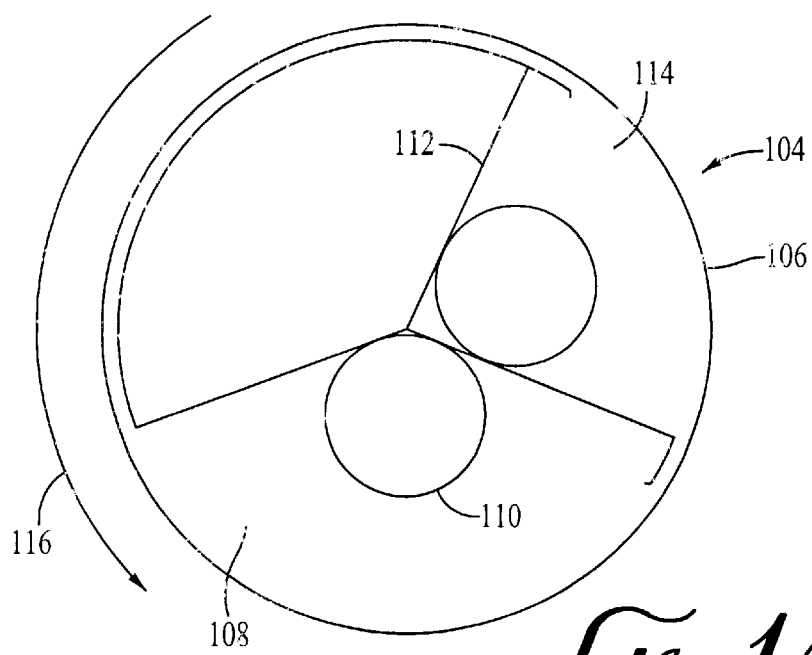
FIG. 16 is a schematic cross-sectional end side view of the skinning device.

A skinning device, generally designated 104, is located behind the rotatable cutter 66 as can be seen in FIG. 8. FIG. 16 illustrates a schematic of the skinning device 104. The skinning device includes a hollow cylindrical wheel 106 which has a porous cylindrical surface. A portion of the wheel is segmented by a vacuum manifold 108. The vacuum manifold 108 communicates with a vacuum source 110. A compressed air manifold 112 divides a second segment from the wheel. A source of compressed air 114 communicates with the segment under pressure. The rotation of the wheel is illustrated by the arrow 116 in FIG. 16. The manifolds remain stationary during rotation of the wheel 106. As illustrated in FIG. 8, a skinning knife 116 extends to approximately a constant displacement from the cylindrical surface of the wheel 106 equal to a layer of skin. The skin is held to the wheel 106 by a vacuum and drawn away from the flesh. The skinning knife 116 facilitates this separation of skin from flesh.

Once the skin has passed beyond the skinning knife 116, it then encounters the compressed air manifold 112 which discharges the skin from the surface of the wheel.

It then may be blown away from the device to discharge into a container 118. The flesh continues down a discharge ramp 120 into a finished product container 122.

Turning again to FIG. 5, the system contemplates an electronic controller associated with a number of sensors and components. Outlet sensors 124 are positioned after the skinning knives 116. These outlet sensors detect the presence of poultry passing from a processing unit 34. The signal from this sensor may be employed by the controller to retract a gate 48 which is aligned with the processing unit 34 into the retracted position to feed additional quarter legs into the unit. Gate sensors 126 are adjacent the truncated conical surface 46 to again sense poultry. When poultry is sensed by a gate sensor 126, the gate sensor 126 closes by extending to a first position against the truncated conical surface 46. Finally, actuation sensors 128 are located in the converging inlets of the processing units 34. Upon sensing the presence of a piece of poultry, the signal from the actuation sensor 128 results in the controller energizing the source of vacuum to draw the tibia portion of the quarter leg into the rotatable cutter 66.

In operation, poultry pieces are fed from the hopper 20 by the belt 22 into the distribution housing 26 of the poultry processing machine. The dome 42 ultimately distributes the pieces outwardly to the gates 48.

Looking to one of the processing units 34, the gate 48 is initialized open or is opened by the passage of a prior piece of boned and skinned quarter leg passed the outlet sensor 124. Through vibration or other means, the piece of chicken passing through the gate 48 passes radially from the truncated conical surface 46 and into a processing unit 34.

Upon encountering the substantially parallel horizontally extending bars 60 and 62, the thinner end of the quarter leg is able to fall between the bars. Upon sensing the presence of the quarter leg in the inlet, the source of vacuum 80 is energized to draw the extending tibia end of the quarter leg into the passage first defined by the knife element 68 of the rotatable cutter 66. As the quarter leg progresses, the circular blade 86 slices the flesh longitudinally along the bone. The rotatable cutter 66 rotates to cut the flesh from the bones as the bones progress through the pipe 74. As the flesh is being stripped from the bones and as the flesh is being cut longitudinally, the flesh encounters the ridge 98 and wall 96 of the spreading surface 92. As the quarter leg progresses, the flesh spreads out into a flat slab. As the process continues, the flesh encounters and is squeezed between the discharge surface 102 and the wheel 106 of the skinning device 104. As the wheel 106 applies vacuum through the porous surface in this region, the skin of the now deboned piece is drawn against the wheel 106. The skinning knife 116 helps to separate the skin from the flesh as the wheel 106 draws the skin upwardly away from the flesh as the wheel 106 rotates. The flesh continues to the container 122 while the skin continues to move with the surface of the wheel 106 until reaching the pressurized zone. At this point, the skin is blown off and into the container 118. After the bones are separated from the flesh along pipe 74, the vacuum through the vacuum source 80 continues to draw the bones downwardly and into the manifold 78.

The controller functions to first open the gate 48 for admission of a quarter leg. Upon sensing of the quarter leg by the gate sensor 126, the gate 48 is closed. As the quarter leg continues into the inlet of the processing unit 34, vacuum is drawn through the pipe 74. Once the piece leaves the actuation sensor 128, after a time delay, the vacuum source 80 is deenergized. This allows the bone or bones within the manifold 78 to then drop through the one-way door 82 into the container 84. Finally, as the now boned and skinned flesh leaves the processing unit 34 along the discharge ramp 120, the outlet sensor 124 signals to open the corresponding gate 48 for the admission of a next quarter leg for processing.

Accordingly, a new process for the boning and skinning of chicken is described in association with the hardware for accomplishing this result. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. A poultry processing machine comprising
   a rotatable cutter including knife elements and a passageway about which the knife elements are arranged with the cutting edges in a circle concentrically arranged about the axis of rotation of the rotatable cutter;
   a source of vacuum in communication with the passageway;
   a blade before the cutting edges of the knife elements, the axis of rotation of the rotatable cutter being in the plane of the rotatable circular blade;
   a skinning device behind the cutting edges of the knife elements and including a hollow wheel having a porous cylindrical surface, a vacuum manifold within the hollow wheel, a compressed air manifold within the hollow wheel and a skinning knife adjacent and spaced from the cylindrical surface of the hollow wheel and adjacent the vacuum manifold.

2. A poultry processing machine comprising
   a dome rotatable about a vertical axis;
   a truncated conical surface extending outwardly from and concentrically with the dome;
   gates extending about the truncated conical surface and movable from a first position on the truncated conical surface to a second position displaced upwardly from the truncated conical surface;
   rotatable cutters each including knife elements and a passageway about which the knife elements are arranged with the cutting edges in a circle concentrically arranged about the axis of rotation of the rotatable cutter;
   converging inlets above each rotatable cutter, the converging inlets being below the edge of the truncated conical surface with each inlet aligned with a gate.

3. The poultry processing machine of claim 2 further comprising
   rotatable circular blades before the edges of the knife elements, the axis of rotation of the rotatable cutters being in the planes of the rotatable circular blades, respectively.

4. The poultry processing machine of claim 3 further comprising spreading surfaces, the rotatable cutters extending through the spreading surfaces, respectively, the spreading surfaces each including a wall extending to before the edges of the knife elements on one side of the rotatable cutter, a ridge extending from the wall to the rotatable cutter and a discharge surface extending from the rotatable cutter, the rotatable cutters circular blades extending toward the axes of rotation of the of the rotatable cutters from the walls, respectively.

5. The poultry processing machine of claim 3 further comprising
traction wheels rotatably mounted with the rotatable circular blades and to either side thereof with the circular blades extending radially from between the traction wheels.

6. The poultry processing machine of claim 2 further comprising
skinning devices behind the edges of the knife elements of the rotatable cutters, respectively, and each including a hollow wheel having a porous cylindrical surface, a vacuum manifold within the hollow wheel, a compressed air manifold within the hollow wheel and a skinning knife adjacent and spaced from the cylindrical surface of the hollow wheel and adjacent the vacuum manifold.

7. The poultry processing machine of claim 6 further comprising
a controller, the gates being coupled with the controller;
outlet sensors after the skinning knives for detecting the presence of poultry and coupled with the controller, the controller retracting the gates to the second position displaced upwardly from the truncated conical surface with the sensors detecting the presence of poultry.

8. The poultry processing machine of claim 6 further comprising
a controller, the gates and the source of vacuum being coupled with the controller;
gate sensors adjacent the truncated conical surface for detecting the presence of poultry on the truncated conical surface and coupled with the controller, the controller extending the gates to the first position on the truncated conical surface with the sensors detecting the presence of poultry on the truncated conical surface;
actuation sensors in the converging inlets for detecting the presence of poultry and coupled with the controller, the controller energizing the source of vacuum when sensing poultry in the converging inlets;
outlet sensors after the skinning knives for detecting the presence of poultry and coupled with the controller, the controller retracting the gates to the second position displaced upwardly from the truncated conical surface with the sensors detecting the presence of poultry.

9. The poultry processing machine of claim 2 further comprising
pairs of horizontally extending bars pivotally mounted in the inlets about vertical axes, respectively.

10. The poultry processing machine of claim 2 the knife elements of the rotatable cutters each further having an extended resilient support flexible toward and away from the axis of rotation of the rotatable cutter.

11. The poultry processing machine of claim 2 further comprising
a controller, the gates being coupled with the controller;
gate sensors adjacent the truncated conical surface for detecting the presence of poultry on the truncated conical surface and coupled with the controller, the controller extending the gates to the first position on the truncated conical surface with the sensors detecting the presence of poultry on the truncated conical surface.

12. The poultry processing machine of claim 2 further comprising
a controller, the source of vacuum being coupled with the controller;
actuation sensors in the converging inlets for detecting the presence of poultry and coupled with the controller, the controller energizing the source of vacuum when sensing poultry in the converging inlets.

* * * * *